United States Patent [19]
Hosseini et al.

[11] Patent Number: 5,846,161
[45] Date of Patent: Dec. 8, 1998

[54] CONTROL SYSTEM FOR AN AUTOMATIC TRANSMISSION HAVING SHIFT POINTS BASED ON PART THROTTLE POSITIONS WHICH ARE USED WHEN ENGINE SPEED IS LOWERED BELOW AN ADJUSTABLE MINIMUM ENGINE SPEED SETTING

[75] Inventors: Javad Hosseini, Edelstein; Randall M. Mitchell, Washington; Douglas A. Carlson, Morton; David L. Dickrell, Dunlap, all of Ill.

[73] Assignee: Caterpillar Inc., Peoria, Ill.

[21] Appl. No.: 759,345

[22] Filed: Dec. 3, 1996

[51] Int. Cl.$^6$ .................................................. B60K 41/04
[52] U.S. Cl. .......................... 477/115; 74/336 R; 701/55; 701/56
[58] Field of Search ..................... 74/835, 336; 477/120, 477/121, 115; 701/55, 56, 54, 51

[56] References Cited

U.S. PATENT DOCUMENTS

| | | | |
|---|---|---|---|
| 2,913,931 | 11/1959 | Hilpert | 74/336 R X |
| 4,414,863 | 11/1983 | Heino | 701/56 |
| 4,698,763 | 10/1987 | Smyth | 701/56 |
| 4,947,331 | 8/1990 | Speranza | 701/55 |
| 5,274,553 | 12/1993 | Boardman | 701/55 |
| 5,341,703 | 8/1994 | Palansky et al. | 477/120 X |
| 5,406,861 | 4/1995 | Steeby | 74/336 R |

Primary Examiner—Rodney H. Bonck
Assistant Examiner—Ankur Parekh
Attorney, Agent, or Firm—Calvin E. Glastetter

[57] ABSTRACT

A control system and method is provided for changing the shiftpoints of a transmission for part throttle shifting. A input section delivers a actual gear signal, a engine speed signal and a torque converter output speed signal A controller receives the input signals and varies the transmission shiftpoints relative to the received signals. The controller also delivers signals to the transmission to upshift, downshift or that no shift is necessary.

16 Claims, 6 Drawing Sheets

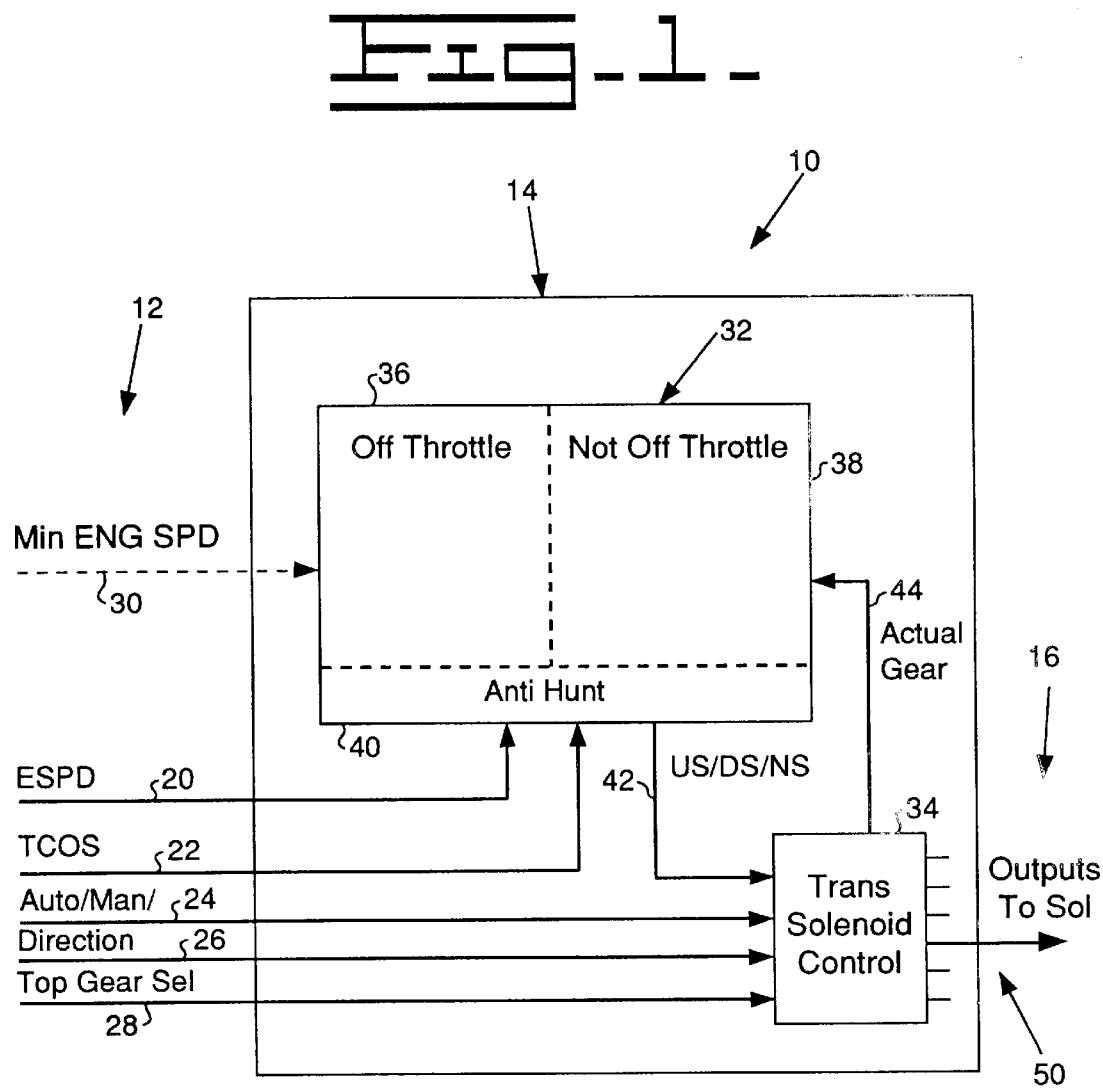

Fig-4-
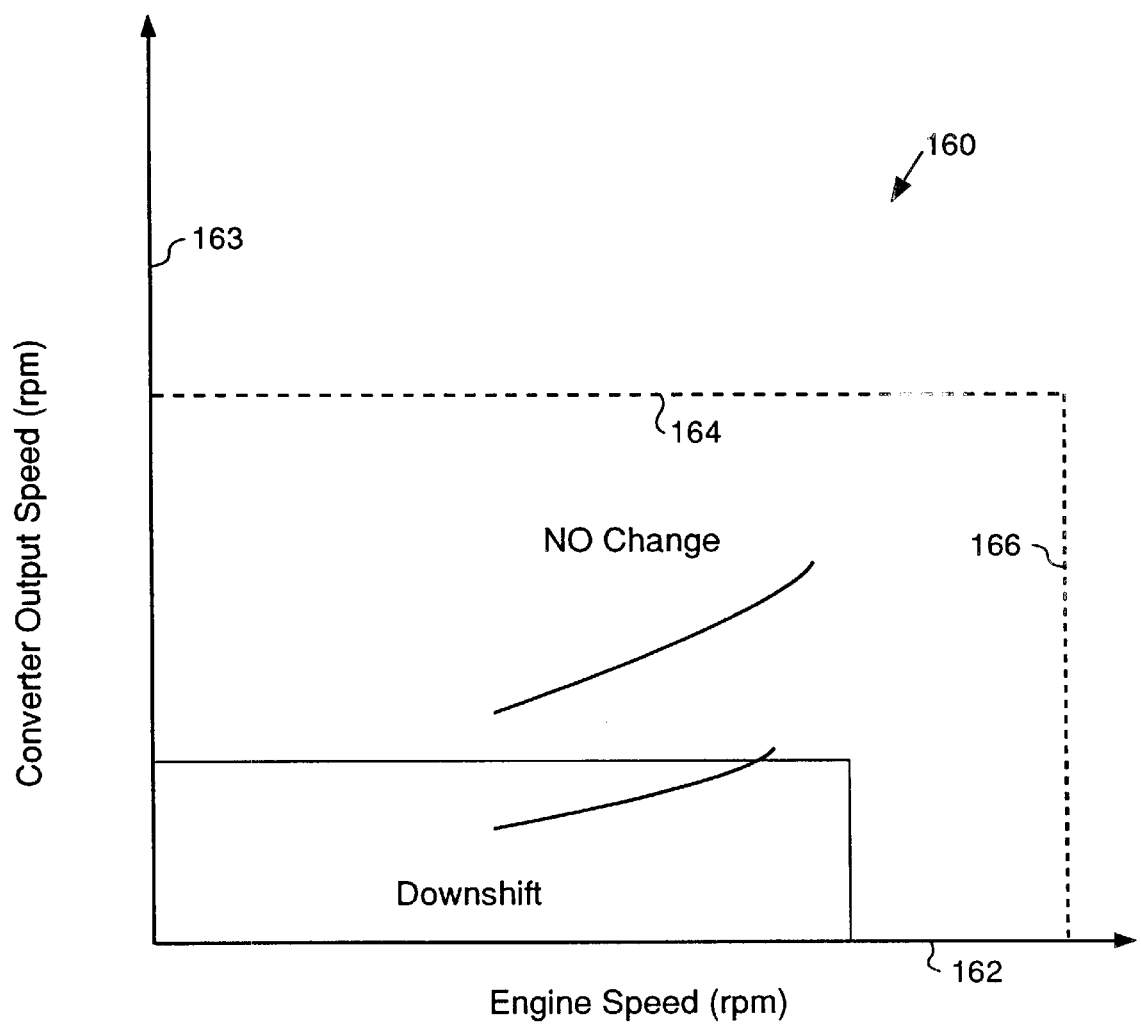

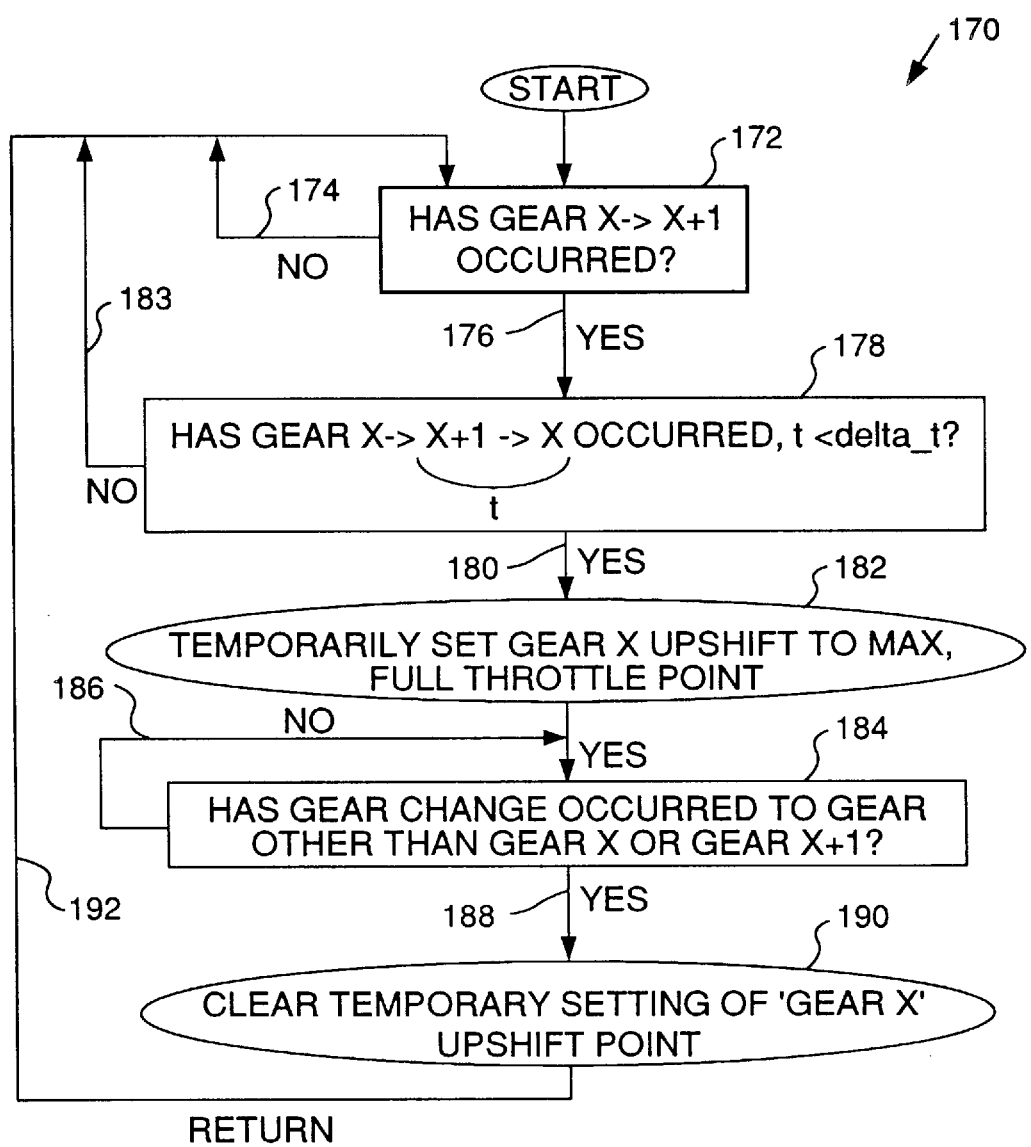

CONTROL SYSTEM FOR AN AUTOMATIC TRANSMISSION HAVING SHIFT POINTS BASED ON PART THROTTLE POSITIONS WHICH ARE USED WHEN ENGINE SPEED IS LOWERED BELOW AN ADJUSTABLE MINIMUM ENGINE SPEED SETTING

TECHNICAL FIELD

This invention relates to a control system for controlling a transmission and more particularly to a control for changing the shiftpoints for part throttle shifting of the transmission during the automatic mode.

BACKGROUND ART

Control systems are used to allow for manual operation and automatic operation. In the automatic operation the control system will automatically shift a transmission by using preprogrammed shift points that are based on full throttle positions of engine speed. The shift points are set to work over a broad range of conditions and operators, however in certain situations it would be useful to provide shiftpoints based on part throttle positions to reduce noise and have smoother operation. For a machine working in light loading conditions or while roading it would be more efficient to upshift through the gears at a lower engine speed. In previous systems the shiftpoints could be changed based on a throttle position sensor input. The throttle position sensors could be unreliable and also allowed the shiftpoints to be changed even if the engine speed was too low, thus affecting efficiency and the operation of the machine.

The present invention is directed to overcoming one or more of the problems as set forth above.

DISCLOSURE OF THE INVENTION

In one aspect of the present invention a control system is adapted to be used on a machine having an engine and a transmission having a torque converter. The control system is used for controlling the shifting of the transmission and includes a first input signal indicative of the actual gear of the transmission, a second input signal indicative of the speed of the engine, a third input signal indicative of the output speed of the torque converter. A controller is provided for receiving the input signals and adjusts the relationship between the machine and the transmission gear according to predetermined relationships.

In another aspect of the present invention, a method of operating a control system associated with a machine having an engine and a transmission having a torque converter includes the steps of: sensing a actual gear signal, sensing a engine speed signal, sensing a torque converter output speed signal, comparing the sensed signals and determining when the transmission is to be upshifted, downshifted or unchanged, and sending a signal to the transmission to perform the determined action.

The present invention provides a control system which allows the shiftpoints of the transmission to be changed when in the automatic mode. The shiftpoints can be changed using the actual gear, the engine speed signal and the torque converter output speed signal to adjust machine operations to the type of work being performed thus improving machine performance. These signals are provided on the machine for other functions and can be used to change the shiftpoints.

BRIEF DESCRIPTION OF THE DRAWINGS

FIG. 1 is a block diagram of the controller apparatus for controlling the operation of the control system of the present invention.

FIG. 4 is a diagrammatic chart illustrating the shift functions as the minimum engine speed changes in the "off throttle" mode.

FIG. 5 is a logic flow diagram illustrating the anti-hunting functions of the controller.

BEST MODE FOR CARRYING OUT THE INVENTION

Figure 2A:
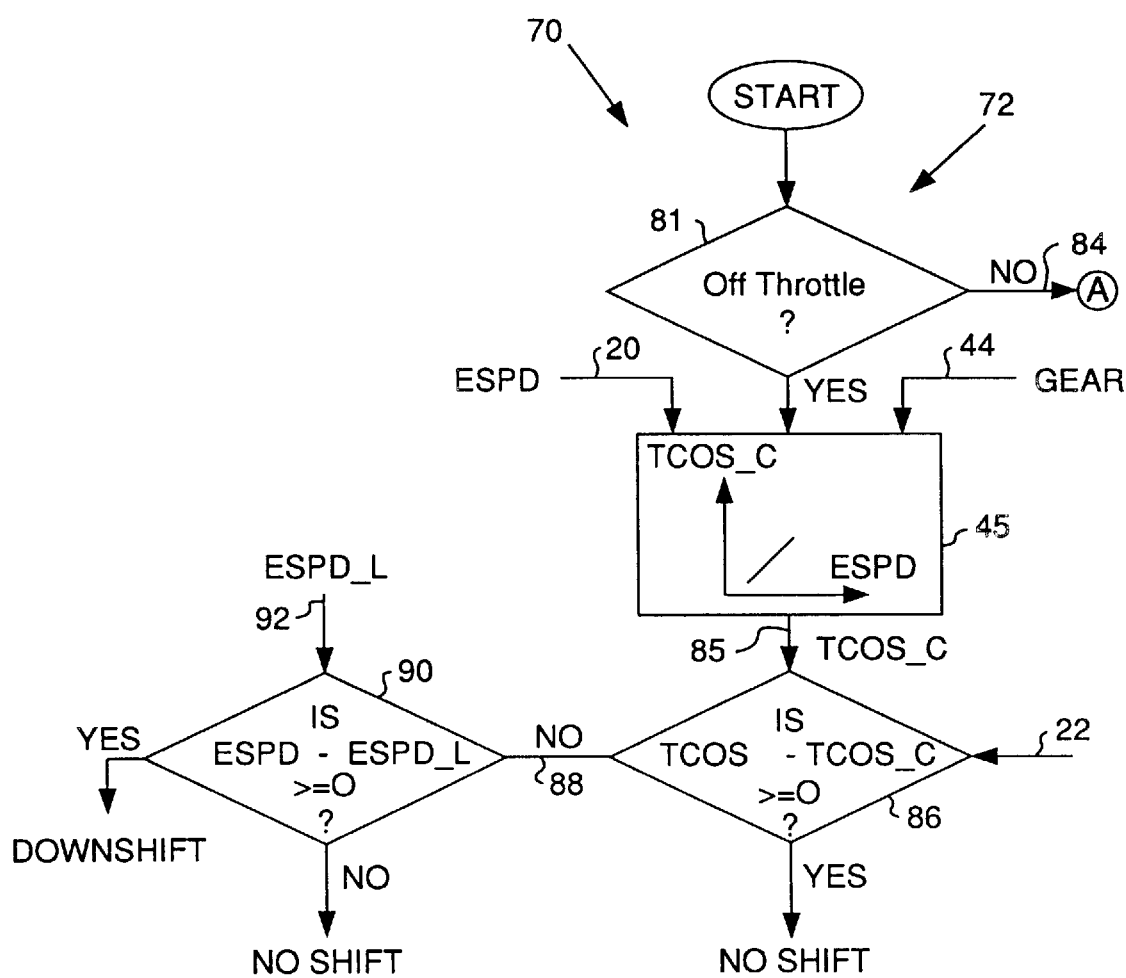
FIG. 2A is a logic flow diagram illustrating the automatic decision making functions of the controller in the "off throttle" mode.

Referring to FIG. 1, the control system 10 includes an input section 12, a controller such as a microprocessor 14 and a output section 16. The control system 10 is adapted to be used on a machine having an engine and a transmission with a torque converter disposed therebetween (not shown) to control the shiftpoints of the transmission.

The input section 12 includes an engine speed signal 20, a torque converter output speed signal 22, a mode signal 24 indicating if the control system is to operate in a manual mode, at automatic full throttle mode or an automatic part throttle mode, a directional signal 26 indicating whether the machine is operating in the forward or reverse direction, a top gear selector signal 28, and a minimum engine speed signal 30. The minimum engine speed signal 30 can be variably adjusted for changing the minimum engine speed setting.

The controller 14 includes an auto shift module 32 and a transmission solenoid control module 34. The auto shift module receives the input signals 20, 22, 30 and the transmission solenoid control module 34 receives the input signals 24, 26, 28 and controls the shifting of the transmission relative to the received signals. The auto shift module 32 includes an "off throttle" module 36, a "not off throttle" module 38 and an anti-hunting module 40. A signal 42 is sent from the auto shift module 32 to the transmission solenoid control module 34 to indicate if an upshift, downshift or no shift is needed. The transmission solenoid control module 34 sends a signal 44 to the auto shift module to indicate what the actual gear of the transmission is. The modules 36, 38 each include a plurality 45 of lookup tables, two for each gear, one for upshift and one for downshift. The lookup tables are similar only having different values which relate to the particular current gear. The auto shift module 32 uses the plurality of lookup tables and associated logic (to be described later) to control the shifting of the transmission when in the automatic mode.

The output section 16 includes a plurality of signals 50 which are sent from the transmission solenoid control 34 to solenoids, not shown, of the transmission for controlling the shifting of the transmission when in the automatic mode.

Figure 2B:
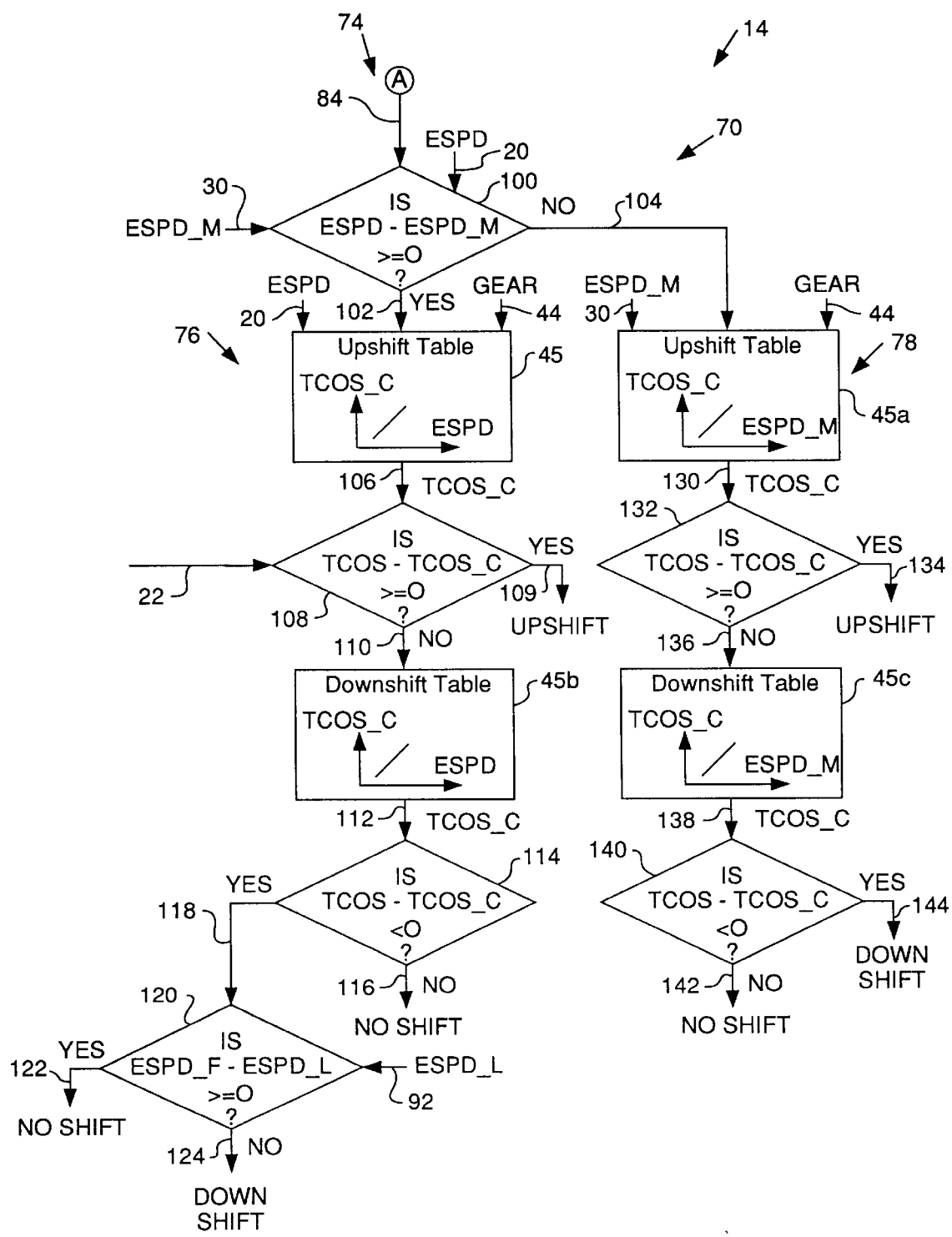
FIG. 2B is a logic flow diagram illustrating the automatic decision making functions of the controller in the "not off throttle" mode.

Referring to FIGS. 2A and 2B, the controller 14 includes a control logic 70 and receives the input signals 20, 22, 30, the internal signal 44 and performs operations based on the received inputs. The control logic 70 consists of a first control logic 72, FIG. 2A, within the "off throttle" module 36 and a second control logic 74, FIG. 2E, within the "not off throttle" module 38. The second logic 74 has a first branch 76 which is on one side of the minimum engine setting and a second branch 78 which is on the opposite side of the minimum engine speed setting, as shown by line 80 in FIG. 3.. Which lookup table to use is dependent on the actual gear signal 44. Only one lookup table will be described in the logic functions. Referring to FIG. 2A logic block 81 determines if control logic 72 or 74 is to be used. Control logic 72 will be used if the ratio of torque converter output speed divided by engine speed is greater than or equal to 1.2 or if the rate of change is less than or equal to a negative large number. If either of the above statements is true, control logic 72 is used and a signal is sent to one of the shift tables 45 associated with the actual gear. If neither statement is true, a signal 84 is sent to the control logic 74, FIG. 2B. The shift table 45 receives the engine speed signal 20 and the actual gear signal 44 and calculates a torque converter output speed and sends a signal 85 to a logic block 86. The logic block 86 receives the calculated torque output speed signal 85, the actual torque converter output speed signal 22 and determines if the actual torque output speed minus the calculated torque converter speed is greater than or equal to zero. If greater than or equal to zero, no shift is required. If less than zero, a signal 88 is sent to a logic block 90. The logic block 90 receives the signal 88, an engine speed limit signal 92 and determines if the engine speed minus the engine speed limit is greater than or equal to zero. If greater than or equal to zero, a downshift is required. If less than zero, no shift is required.

Referring to FIG. 2B, a logic block 100 receives the signal 84 indicating a "not off throttle" condition, the engine speed signal 20, and the minimum engine speed signal 30. In logic block 100, the minimum engine speed signal 30 is subtracted from the engine speed signal 20. If the result is greater than or equal to zero, a signal 102 is sent to the upshift lookup table 45 in the first branch 76. If the result is less than zero, a signal 104 is sent to the upshift lookup table 45a in the second branch 78.

The upshift lookup table 45 in the first branch 76 receives the actual gear signal 44, the engine speed signal 20 and the signal 102. The received signals are used to calculate a torque converter output speed and a signal 106 representing the calculated speed is sent to a logic block 108. In the logic block 108, the calculated torque converter output speed signal 106 is subtracted from the actual torque converter output speed signal 22. If the result is greater than or equal to zero a signal 109 is sent to the solenoid control module 34 to upshift the transmission. If the signal is less than zero a signal 110 is sent to the downshift lookup table 45b. The downshift lookup table 45b receives the signal 110 and reviews the input and sends a calculated torque converter output speed signal 112 to a logic block 114. In the logic block 114, the calculated torque converter output speed signal 112 is subtracted from the actual torque converter output speed signal 22. If the result is greater than or equal to zero a signal 116 is sent to the module 34 indicating no shift. If the result is less then zero, a signal 118 is sent to a logic block 120. In logic block 120 the engine speed limit signal 92 is subtracted from the actual engine speed signal 20. If the result is greater than or equal to zero, a signal 122 is sent to the module 34 indicating no shift. If the result is less than zero, a signal 124 is sent to the module 34 to downshift.

The upshift lookup table 45a in the second branch 78 receives the current gear signal 44, the minimum engine speed signal 30 and the signal 104. The received signals are used to calculate a torque converter output speed signal 130 which is sent to a logic block 132. In logic block 132, the calculated torque converter output speed signal 130 is subtracted from the actual torque converter output speed signal 22. If the result is greater than or equal to zero, a signal 134 is sent to the module 34 to upshift the transmission. If the result is less than zero, a signal 135 is sent to the downshift lookup table 45c. The downshift table 45c receives and reviews the inputs and sends a calculated torque output speed signal 138 to a logic block 140. In logic block 140, the calculated torque converter output speed signal 138 is subtracted from the actual torque converter output speed signal 22. If the result is less than zero, a signal 142 is sent to the module 34 indicating no shift. If the result is greater than or equal to zero, a signal 144 is sent to the module 34 to downshift the transmission.

Figure 3:
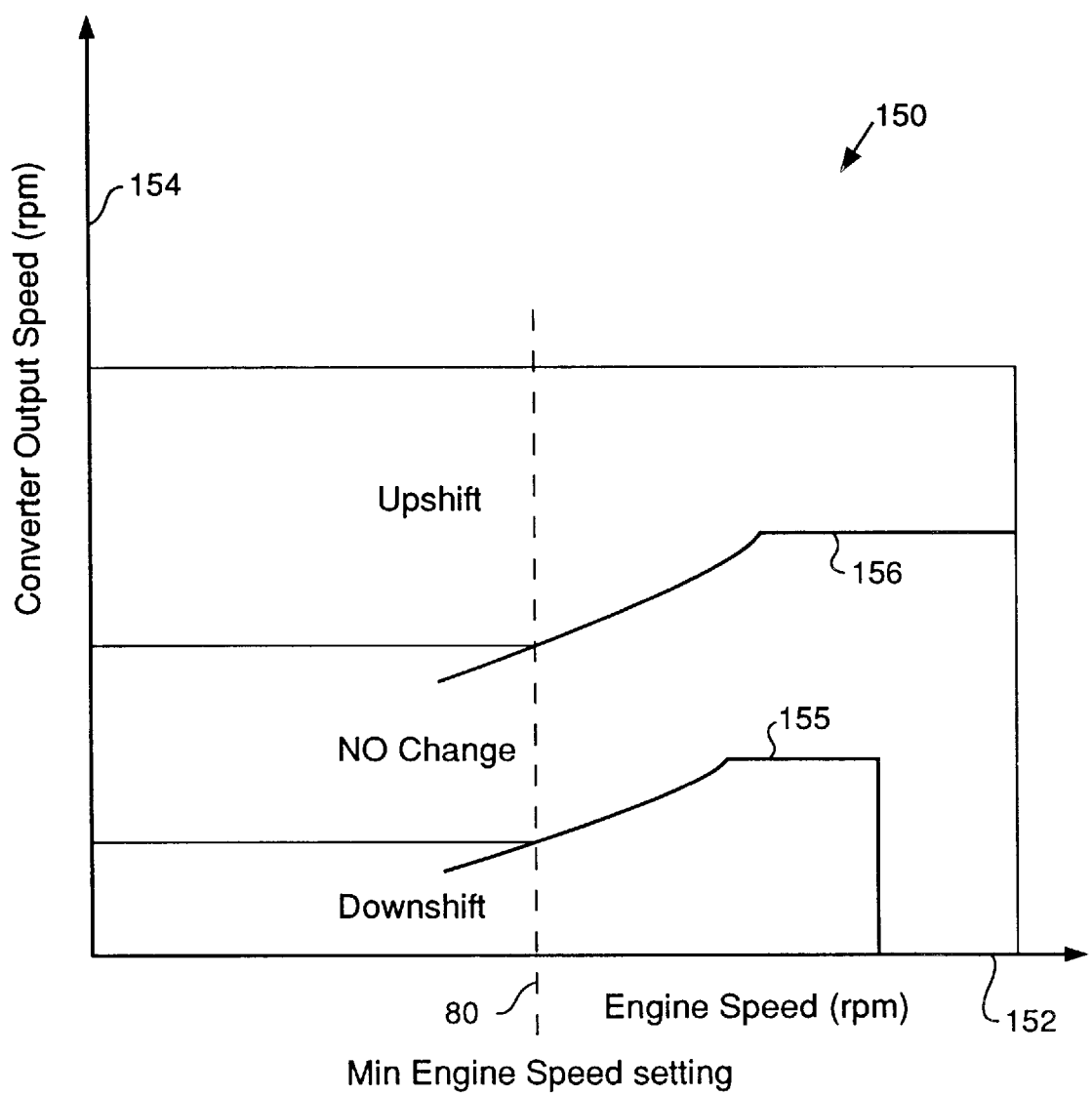
FIG. 3 is a diagrammatic chart illustrating the shift functions as the minimum engine speed changes in the "not off throttle" mode.

Referring to FIG. 3, a chart 150 is used to represent what shift logic is used in the "not off throttle" mode. The chart 150 shows how the downshift, no change and the upshift regions change as the minimum engine speed signal 30 is changed as represented by line 80. As the line 80 is moved along an engine speed axis 152 and a torque converter output speed axis 154 the regions will change. The chart 150 contains lines 155, 156 which create regions of upshift, downshift and no change for various conditions during the "not off throttle" mode. The control logic 70 and shift functions will change as the minimum engine speed setting changes by movement of the minimum engine speed line 80. The first branch 76 of the control logic 70 will be used to the right, as viewed from the drawing, of the line 80 and the second branch 78 will be used to the left of the line 80. The operator can vary the minimum engine speed line 80 along the engine speed axis 152 to limit how low the engine speed would be allowed to go before downshifts would be required or upshifts would be inhibited. This chart allows the control to require only torque converter output speed and engine speed inputs to make decisions about shiftpoint selection for various machine usage. The control can provide variable shiftpoints with only these inputs.

Referring to FIG. 4, a chart 160 is used to represent what shift logic is used in the "off throttle" mode having the various regions. The chart 160 shows how the downshift and no shift regions change along an engine speed axis 162 and a torque converter output speed axis 163. A line 164 represents excessive torque converter output speed and a line 166 represents excessive engine speed. The region above these lines 164, 166 would require an upshift to affect component life and machine control. In the no change region it is not desirable to upshift at conventional upshift speeds because greater retarding capacity is available in the current gear then in a next higher gear. If the converter output speed falls below the normal full throttle downshift point, the control will cause a downshift to provide increased retarding in part throttle shiftpoints.

While "not off throttle" and "off throttle" modes are needed to decide which of the charts 150, 160 to use, the logic can use speed history data or other similar data to determine which mode is to be used. No throttle sensor is required for the control to function.

Referring to FIG. 5, an anti-hunting loop 170 and associated logic is shown to prevent transmission cycling between upshift and downshift. The anti-hunting loop is active when the control system is in the automatic mode and when the control system calls for an upshift. Transmission hunting is when the transmission downshifts within a predetermined amount of time after upshift.

In logic block 172 it is determined if the transmission has upshifted from one gear to the next highest gear. If the transmission has not shifted, a signal 174 is looped around to start again. If the transmission has shifted to the next highest gear a signal 176 is sent to a logic block 178. In logic block 178 it is checked if the transmission has upshifted to the next highest gear and then downshifted again before a predetermined amount of time has passed. For example delta_t, in this situation could be set at fifteen seconds and if the transmission downshifts before fifteen seconds a signal 180 is sent to a logic block 182. If the transmission did not downshift within the fifteen seconds, a signal 183 is looped back to the start. logic block 182 will disable part throttle and temporarily revert to the preprogrammed full throttle shift points and send a signal to a logic block 184. Logic block 184 checks to see if an upshift above the "problem gear" or downshifted below the initiation gear of the hunting cycle occurs. If no upshift has been made a signal 186 is looped back. If an upshift greater then the next highest gear has been made, a signal 188 is sent to a logic block 190. Logic block 190 will clear the temporary upshift setting and send a signal 192 back to logic block 172 to start over. The setting should not be cleared until the upshift or downshift has been completed. The part throttle shift setting can also be re-enabled when the operator requests an upshift, a downshift, a change in direction occurs, or the engine speed is below a predetermined value for more than one second.

Industrial Applicability

In use of the control system of the present invention the operator can choose if the transmission should be shifted manually or automatically. When in the automatic mode the operator can choose to use the preprogrammed full throttle shift points or can adjust the minimum engine speed setting to use part throttle shift points.

The operator controls the signal 24 for the manual mode or automatic mode. If the operator chooses the automatic mode he can also select the top gear setting so that the transmission will not upshift beyond the selected top gear. With the control system 10 in the automatic mode, the controller 14 receives the engine speed signal 20, the torque converter output speed signal 22 and the actual gear signal 44 and controls shifting of the transmission based on these signals. The minimum engine speed signal 30 can be used to vary the shiftpoints as a function of the received signals. The operator may affect the shiftpoints by selecting the minimum engine speed signal 30 by controlling the placement of a switch, not shown. The controller 14 uses the inputs to adjust the shiftpoints to automatically shift through the gears. The controller 14 receives the actual gear signal 44 and determines which set of lookup tables correspond to the actual gear. Using the lookup table and the various inputs the controller will upshift or downshift based on the received signals. The control logic 70 will perform the functions to determine if the transmission should upshift, downshift or no shift is necessary. If the controller determines that an upshift is required, the anti-hunting loop 170 will perform various functions to determine if the shift has been carried out and that the transmission did not downshift again within a predetermine time frame.

In view of the foregoing the control system can be used to affect the shiftpoints of the transmission. The shiftpoints can be changed to improve efficiency or can be adjusted to meet operator preferences. In certain situations the operator would like the transmission to shift to the next gear sooner and at lower engine speeds to improve machine performance. An anti-hunting control is also provided to insure that the transmission does not cycle between the upshift and the downshift and will revert to the full throttle setting to prevent hunting.

Other aspects, objects and advantages of this invention can be obtained from a study of the drawing, the disclosure and the appended claims.

We claim:

1. A control system adapted to be used on a machine having an engine and a transmission with a torque converter disposed therebetween, the transmission having predefined shiftpoints at a normal operating speed of the engine, the control system, comprising:

a first input signal operative to sense the actual transmission gear;

a second input signal operative to sense the speed of the engine;

a third input signal operative to sense the output of the torque converter;

a fourth input signal operative to sense a minimum engine speed setting; and a controller receiving the input signals and adjusting the shiftpoints within the transmission in response to lowering the speed of the engine to a predetermined minimum engine speed, said predetermined minimum engine speed being the minimum engine speed setting sensed by said fourth input signal.

2. The control system of claim 1 wherein the fourth input signal is adjustable by an operator for controlling the shiftpoints of the transmission.

3. The control system of claim 1, wherein the first input signal is received from a solenoid control of the control system.

4. The control system of claim 2, wherein the fourth input signal is adjustable by an operator to change the minimum engine speed setting for controlling the point at which the transmission shifts.

5. The control system of claim 1, wherein the controller includes a set of lookup tables which relate to the actual gear input signal.

6. The control system of claim 5, wherein the set of lookup tables includes a first table relating to upshift and a second table relating to downshift.

7. The control system of claim 1, includes a fifth signal switchable between a first mode at which the control system is in the manual mode and a second mode at which the control system is in the automatic mode.

8. The control system of claim 7, wherein when the fifth signal is in the manual mode the operator controls the shifting point of the transmission.

9. The control system of claim 7, wherein when the fifth signal is in the automatic mode the controller controls the shifting of the transmission relative to the input signals.

10. The control system of claim 1, wherein the controller includes an anti-hunting loop to prevent cycling of the transmission between upshift and downshift.

11. The control system of claim 10, wherein the anti-hunting loop is active during an upshift.

12. The control system of claim 1, including a signal from a control logic which limits the upper engine speed.

13. A method of operating a control system associated with a machine having an engine and a transmission having a torque converter, the control system includes a controller for controlling shifting of the transmission, the method comprising the steps of:

sensing an actual gear signal;

sensing an engine speed signal;

sensing a torque converter output speed signal;

sensing a minimum engine speed setting signal;

comparing the sensed signals and determining whether the transmission is to be upshifted, downshifted or unchanged; and sending a signal to the transmission to perform the determined action.

14. The method of claim 13, including the step of performing an anti-hunting check during an upshift to prevent cycling of the transmission between upshift and downshift.

15. A control system adapted to be used on a machine having an engine and a transmission with a torque converter disposed therebetween, the transmission having predefined shiftpoints at a normal operating speed of the engine, the control system comprising:

an actual gear input signal;

a second input signal operative to sense the engine speed;

a third input signal operative to sense the torque converter output speed;

a fourth input signal adjustable for changing an minimum engine speed setting for changing the transmission shiftpoints; and a controller for receiving the input signals and adjusting the shiftpoints within the transmission in response to lowering the speed of the engine to a predetermined minimum engine speed corresponding to said minimum engine speed setting.

16. A controls system adapted to be used on a machine having an engine and a transmission with a torque converter disposed therebetween, the transmission having predefined shiftpoints at a normal operating speed of the engine, the control system, comprising:

a first input signal operative to sense the actual transmission gear;

a second input signal operative to sense the speed of the engine;

a third input signal operative to sense the output speed of the torque converter;

a fourth input signal operative to sense a minimum engine speed setting, the fourth input signal being adjustable by an operator for controlling the shiftpoints of the transmission; and a controller receiving the input signals and adjusting the shiftpoints within the transmission in response to lowering the speed of the engine to a predetermined minimum engine speed, said predetermined minimum engine speed being the minimum engine speed setting sensed by said fourth input signal.

* * * * *